United States Patent [19]

Unzens

[11] 4,367,092

[45] Jan. 4, 1983

[54] CORROSION-INHIBITING ACID BURNISHING COMPOUND

[75] Inventor: Bruno E. Unzens, Kalamazoo, Mich.

[73] Assignee: Roto-Finish Company, Inc., Kalamazoo, Mich.

[21] Appl. No.: 284,060

[22] Filed: Jul. 16, 1981

[51] Int. Cl.$^3$ .............................................. C09G 1/04
[52] U.S. Cl. ...................................... 106/3; 106/14.13; 106/14.15; 134/3; 134/41; 252/79.1; 252/148; 252/391
[58] Field of Search ...................... 106/3, 14.13, 14.15; 134/3, 41; 252/79.1, 148, 391; 29/90 R

[56] References Cited

U.S. PATENT DOCUMENTS

| | | | |
|---|---|---|---|
| 3,166,444 | 1/1965 | Ehren et al. | 134/3 |
| 3,556,994 | 1/1971 | Diery et al. | 252/391 |
| 4,235,051 | 11/1980 | Spekman | 51/316 |

Primary Examiner—Lorenzo B. Hayes
Attorney, Agent, or Firm—Gordon W. Hueschen

[57] ABSTRACT

A metal finishing composition particularly useful for burnishing of metallic components while subjecting said metallic components to the action of a solid finishing media, said composition comprising an acidic burnishing media and, as a rust and discoloration inhibitor component thereof, a mixture of the compounds 6-[methyl(phenylsulfonyl)amino] hexanoic acid and 2,2', 2"-nitrilotris(ethanol), is disclosed.

16 Claims, No Drawings

CORROSION-INHIBITING ACID BURNISHING COMPOUND

BACKGROUND OF INVENTION

1. Field of Invention

Finishing compounds for barrel and/or vibratory and/or gyratory and/or centrifugal surface finishing and/or conditioning of metallic components, e.g., parts or workpieces, particularly such compound which has corrosion-inhibiting properties and which is particularly well-adapted for use in the finishing of such components in the presence of an acidic burnishing compound; method of finishing, e.g., burnishing, therewith.

2. Prior Art

Innumerable compositions or "compounds" have been proposed previously for the purpose of assisting with the finishing of parts or workpieces by the employment of finishing media of various types, including the employment of case-hardened steel burnishing balls for the burnishing of steel and other ferrous and non-ferrous metal parts. Such compositions or "compounds" have had innumerable formulations and a wide variety of components. For the finishing of ferrous or non-ferrous metal parts, particularly the burnishing thereof with case-hardened steel or other steel burnishing balls, employment of a so-called "burnishing compound" has become standard in the art. Such burnishing compositions or "compounds" are either of a basic or an acidic nature and, regardless of their nature, it has become standard practice of the art to include in the burnishing compound a so-called inhibitor "package," including one or more components which are present for purposes of inhibiting rust when ferrous or non-ferrous metals are being finished and, of course, to inhibit rust in any burnishing process wherein case-hardened or other steel balls are employed. Some indication of the state of the art is provided by the disclosure of U.S. Pat. No. 4,235,051, issued Nov. 25, 1980, the disclosure of which patent is incorporated herein by reference.

Regardless of the type of burnishing compound involved, or the type of inhibitor "package" included, it is a constant effort of the art to attain greater efficiency and to reduce discoloration and rusting of parts being finished as well as the burnishing balls employed in the process. The art has greatly advanced over the past several decades, but improvements in efficiency with resulting improvements in economy are always of greatest interest, and the present invention provides a striking improvement in this art, whereby discoloration and rusting of both metallic parts being finished and burnishing balls employed in the burnishing process are greatly reduced, and which is totally unpredictable due to the fact that the inhibitor package, hereinafter sometimes referred to as "Component X," is recommended for employment in basic media and is expected to be of no effect in prevention of discoloration or rusting when present in an acidic medium, which is the type of burnishing medium involved according to the present invention.

OBJECTS OF THE INVENTION

It is an object of the invention to provide an improved burnishing compound having an improved and unexpectedly effective and efficient inhibitor package which would not be expected to be effective in acidic burnishing media. It is another object of the invention to provide a method of finishing employing such improved burnishing compound. It is a further object of the invention to provide a method of inhibiting discoloration and rusting of ferrous and non-ferrous parts or workpieces being finished, and of steel burnishing balls employed in the finishing process in the presence of an acid burnishing compound, which comprises the step of including in the said acid burnishing compound the rust and discoloration inhibitor of the present invention. An additional object of the invention is the provision of a metal finishing composition particularly useful for burnishing of metallic components while they are being subjected to the action of a solid finishing media which comprises an acidic burnishing media and, as a rust and discoloration inhibitor component thereof, the particular inhibitor according to the present invention. Still other objects of the invention will become apparent hereinafter and still additional objects of the invention will be apparent to one skilled in the art to which this invention pertains.

SUMMARY OF THE INVENTION

The invention may be representatively summarized as follows:

A metal finishing composition particularly useful for burnishing of metallic components while subjecting said metallic components to the action of a solid finishing media, said composition comprising an acidic burnishing media and, as a rust and discoloration inhibitor component (Component X) thereof, a mixture of the compounds 6-[methyl(phenylsulfonyl)amino] hexanoic acid and 2,2′,2″-nitrilotris(ethanol); such composition wherein the amount of the mixture of said compounds is up to about six percent (6%) by weight of the acidic burnishing media; such composition wherein the compounds are present in the burnishing media in the proportion of approximately 1:1; such composition wherein the mixture of compounds has the approximate empirical formula $C_{13}H_{19}NO_4S \cdot C_6H_{15}NO_3$; such composition comprising water in an amount between about 45 and 90 percent by weight, an organic acid in an amount between about 1 and 20 percent by weight, an amphoteric surfactant in an amount of about 1 to about 20 percent by weight, and Component X, which is a mixture of the compounds 6-[methyl(phenylsulfonyl)amino] hexanoic acid and 2,2′,2″-nitrilotris (ethanol), in an amount up to about six percent by weight, the total percentage by weight equalling 100; such composition wherein the said compounds are present in the proportion of approximately one to one; such composition wherein the mixture of compounds has the approximate empirical formula $C_{13}H_{19}NO_4S \cdot C_6H_{15}NO_3$; such composition wherein a salt of an organic acid is also present in an amount up to about fifteen percent (15%) by weight; such composition wherein at least one of the following additional ingredients is also present: a detergent in an amount up to about seven percent (7%) by weight, a wetting agent in an amount up to about five percent (5%) by weight, and a chelating agent in an amount up to about ten percent (10%) by weight; such composition wherein Component X is present in an amount of about one to two percent by weight; such composition comprising water between about 45 and 90 percent by weight, citric or gluconic acid between about 3 and 15 percent by weight, alkali metal salt of citric or gluconic acid between about 3 and about 15 percent by weight, amphoteric surfactant between about 3 and 10 percent by weight, and Component X between about 1 and 6 percent by weight, the total percentage by weight equaling 100; such composition wherein water is present between about 46 and 87 percent by weight, citric acid or gluconic acid is present between about 3 and 15 percent by weight, sodium salt of citric or gluconic acid is present between about 3 and 15 percent by weight, and an amphoteric surfacant which is a potassium salt complex of an N-stearylamino acid is present in an amount between about 3 and 10 percent by weight; such composition wherein citric acid and citric acid sodium salt are present in an amount of about nine percent, and water is present in an amount of about 87 percent; such composition wherein gluconic acid is present in an amount of about 12 percent, sodium gluconate is present in an amount of about three percent, and water is present in an amount of about 81 percent; and such composition wherein water is present in an amount of about 70 percent, citric acid is present in an amount of about 12 percent, sodium citrate is present in an amount of about 12 percent, amphoteric surfactant is present in an amount of about five percent, and Component X in an amount of about one to two percent by weight. Also, the method of inhibiting rust and discoloration of steel in the presence of an acid burnishing compound which comprises the step of including in the said acid burnishing compound up to about six percent by weight of a mixture of the compounds 6-[methyl(phenylsulfonyl)amino] hexanoic acid and 2,2',2"-nitrilotris(ethanol); and such method wherein the compounds are present in an approximately one to one mixture. Also, in a method for imparting surface finish to metallic components while subjecting said metallic components to the action of a solid finishing media in the presence of an acidic burnishing media, the step of employing a mixture of the compounds 6-[methyl(phenylsulfonyl)amino] hexanoic acid and 2,2',2"-nitrilotris(ethanol), as rust and discoloration inhibitor, during the process; such method wherein the two compounds are employed in the proportion of approximately one to one; and such method wherein the mixture of compounds has the approximate empirical formula $C_{13}H_{19}NO_4S.C_6H_{15}NO_3$.

BRIEF DESCRIPTION OF THE INVENTION

According to the present invention, the essential component, hereinafter sometimes referred to as "Component X," of the compositions and methods of the present invention is a combination of the compounds 6-[methyl(phenylsulfonyl) amino] hexanoic acid and 2,2',2"-nitrilotris(ethanol), preferably but not necessarily in proportions of approximately one to one, and having the approximate empirical formula $C_{13}H_{19}NO_4S.C_6H_{15}NO_3$. This Component X constitutes the essential agent for retarding discoloration and inhibiting rust formation in any finishing operation involving either the employment of steel burnishing balls or the finishing of ferrous or non-ferrous metal parts or workpieces. The invention is particularly advantageous when employed for that particular area of finishing known as burnishing. According to this aspect of the finishing field, case-hardened or other steel burnishing balls are tumbled, vibrated, or rotated together with the parts to be finished for purposes of imparting a bright luster and smooth surface finish to the parts involved. The inclusion of Component X in any established acidic burnishing compound is within the scope of the present invention, but particularly advantageous compositions have been found. When employed as a component of an acidic burnishing compound, Component X has been found to retard discoloration and rust formation, as shown by the comparative tests and other tests reported hereinafter. As previously stated, although the inclusion of Component X as an essential ingredient of any acidic burnishing compound is within the scope of the invention, preferred acidic burnishing compounds comprise the following essential ingredients and the following optional ingredients, as hereinbelow designated:

Essential Ingredients:
  Water
  Organic Acid
  Amphoteric Surfactant
  Component X
Optional Ingredients, one or more of which may be included in the acid burnishing compound of the invention:
  Detergent
  Wetting Agent
  Chelating Agent
Preferred Optional Ingredient:
  Organic acid salt, preferably an organic acid alkali metal salt, such as the sodium or potassium salt.

As the organic acid, any suitable organic acid may be employed, such as citric, gluconic, acetic, propionic, maleic, fumaric, tartaric, oxalic, benzoic, or methanesulphonic acid, to name a few, according to the established skill of the art. Other acids are likewise suitable and may be employed if desired. For example, lactic, ethanesulfonic, ascorbic, succinic, salicylic, bismethylenesalicylic, malic, malonic, mandelic, cinnamic, citraconic, stearic, palmitic, itaconic, glycolic, benzenesulphonic, and sulphamic acids may also be employed if desired.

As the optional but preferable salt of the organic acid, any suitable salt may be employed, of any of the foregoing acids, but preferably an alkali metal salt or an alkaline earth metal salt is employed, most preferably an alkali metal salt such as potassium or sodium.

It goes without saying that mixtures of the organic acids and mixtures of the organic acid salts, and mixtures of the two, may also be suitably employed, according to the existing skill of the art.

As the amphoteric surfactant, any suitable amphoteric surfactant may be employed. Alkali metal salts complexed with long-chain fatty amino acids have been found particularly suitable, as indicated by the following examples, but others may likewise be employed. Representative additional amphoteric surfactants which may be employed include:
  coco amido betaines
  substituted imidazolines
  coconut-based amphoteric imidazoline monocarboxylic acid esters, oleyl betaine, and the like.

When other optional ingredients are included, these may be as follows:
  Representative detergents include modified alkanolamides, fatty amide complexes, alkyl sulfonates, alkanolamine condensates, and the like.
  Representative wetting agents include modified linear aliphatic polyethers, phosphate esters, and the like.
  Representative chelating agents include polyaminocarboxylic acids and their sodium salts;
also organic acids such as citric, gluconic, tartaric, and oxalic, sodium glucoheptenate, ethylene diamine tetraacetic acid (EDTA), and the like.

Still other compounds and materials within the scope of both the essential and the unessential ingredients of the acid burnishing compounds of the present invention may be employed and will readily present themselves to one skilled in the art.

DETAILED DESCRIPTION OF THE INVENTION

The following examples are given by way of illustration only and are not to be construed as limiting.

EXAMPLE 1

XL-440 Formula

| Water | 70% by weight |
|---|---|
| Citric Acid | 12 |
| Sodium Citrate | 12 |
| Mafo 13 Mod I | 5 |
| LCI 815 (Component X) | 1, total equals 100% |

The foregoing formula, because of the addition of Component X, has been found to reduce the attack of the organic acid on case-hardened steel. If the Component X is used at a 1-2% concentration by weight, it prevents the steel media from rusting for a period of up to one week, depending upon ambient conditions. This of course includes not only the steel burnishing balls which are employed during the burnishing process, but also the material being burnished. It has also been observed that this formula imparts a brighter finish to non-ferrous metals than is possible using a nitrogen based acid inhibitor, of the type commonly employed in acidic burnishing compounds, such as Armohib 31. In actual tests, the burnishing compound set forth in the foregoing formulation has been found to impart a bright, lustrous finish to both non-ferrous and ferrous metals, employing case-hardened steel burnishing balls as the burnishing medium.

EXAMPLE 2

Modified XL-440 Formula #1

| Water | 87% by weight |
|---|---|
| Citric Acid | 6 |
| 50% Sodium Hydroxide | 3 |
| Mafo 13 Mod I | 3 |
| LCI 815 | 1, total equals 100% |

The same results were obtained employing the foregoing formula as set forth in the foregoing for the formula of Example 1.

EXAMPLE 3

Modified XL-440 Formula #2

| Water | 81% by weight |
|---|---|
| Gluconic Acid | 12 |
| Sodium Gluconate | 3 |
| Mafo 13 Mod I | 3 |
| LCI 815 | 1, total equals 100% |

In actual tests carried out under burnishing conditions, the compound of the foregoing formula produced results similar to those obtained using the burnishing compound or formula of Example 1.

EXAMPLE #4

Formula XL-440 Modification #3

| Water | 70% by weight |
|---|---|
| Anhydrous Citric Acid | 12 |
| Sodium Citrate | 12 |
| Mafo 13 Mod I | 5 |
| LCI 815 | 1, total equals 100% |

In actual tests carried out under burnishing conditions, the compound of the foregoing formula produced results similar to those obtained using the burnishing compound or formula of Example 1.

EXAMPLE #5

XL-440 Formula—Broader Variations

Variations in the amounts of the active ingredients within the following ranges have been made without departing from the excellence of the results obtained.

| Water | 45-90% by weight |
|---|---|
| Citric Acid | 3-15 |
| Sodium Citrate | 3-15 |
| Mafo 13 Mod I | 3-10 |
| LCI 815 | 1-6, total equals 100% |

In actual tests employing the foregoing formula, results over the entire ranges set forth were found to be comparable to those obtained employing the compound of the formula set forth in Example 1.

EXAMPLE #6

XL-440 Formula—Further Modifications

The same excellent results are obtained when the formula for the acidic burnishing compound is varied within the limits indicated in the following:

| Water | 45-90% by weight |
|---|---|
| Organic Acid | 1-20 |
| Salt Organic Acid | 0-15 |
| Amphoteric Surfactant | 1-20 |
| *Detergent | 1-7 |
| *Wetting Agent | 1-5 |
| *Chelating Agent | 5-10 |
| LCI 815 | 1-6, total equals 100% |

*one or more of these ingredients are optional components of the composition.

EXAMPLE #7

Comparative Formulation Employing Usual Acid Inhibitor in Acid Burnishing Compound—L-543 Formula.

The comparative burnishing compound had the following formula, and included an aliphatic nitrogen type of acid inhibitor as is usual in such methods. The formulation was as follows:

| Water | 69.9% |
|---|---|
| Citric Acid | 12 |
| Sodium Citrate | 12 |
| Mafo 13 Mod I | 5 |
| Surfynol 104H | 1 |
| Armohib 31 | .1 |

Glossary of Terms and/or Trademarks Employed in Examples

Term: Mafo 13 Mod I; Supplier: trademark of Mazer Chemical; Ingredients: Potassium salt complex N-stearyl amino acid; Type of component: amphoteric surfactant.

Term: Surfynol 104H; Supplier: trademark of Air Products Co.; Ingredients: 75% solution of tetramethyl decynediol in ethylene glycol; Type of component: wetting agent.

Term: Armohib 31; Supplier: Armak; Ingredients: aliphatic nitrogen-containing compound; Type of component: acid inhibitor.

Term: LCI 815; Supplier: trademark of Lisle Chemical; Ingredients: approximately 1:1 mixture of 6-[methyl(phenylsulfonyl)amino] hexanoic acid and 2,2',2"-nitrilotris(ethanol); Type of component: sold as replacement for sodium nitrite inhibitor, normally used and sold for use in alkaline solutions. This material is herein sometimes designated "Component X."

COMPARATIVE TEST RESULTS AND DATA

I. Inhibition Testing Procedure

For purposes of measuring corrosion-inhibition properties, solutions of one percent and two percent of the acidic burnishing compound of Example 1 were compared with solutions of the acidic burnishing compound of Example 7 at the same concentrations. To each concentration, samples of mild steel and case-hardened steel media were subjected for a period of twenty-four (24) hours by immersion. They were thereafter measured for a weight loss. The results are as follows:

| Results | Burnishing Compound of | | | |
|---|---|---|---|---|
| | Example 7 at 1% | Example 7 at 1% | Example 1 at 1% | Example 1 at 2% |
| Steel media gram weight loss | .0167 | .0354 | | .0032 |
| Steel media percent weight loss | .012 | .024 | | .0022 |
| Mild steel coupon gram weight loss | .0104 | .0094 | .0060 | .0060 |
| Percent weight loss per hour | .0394 | .0336 | .0216 | .0216 |

II. Visual Results of Media Immersion Test

The steel samples and the case-hardened steel burnishing balls remained clean and bright with very little, if any, discoloration, during the foregoing reported tests employing the burnishing compound of Examples 1-6, especially Example 1. In contrast, the steel samples and the case-hardened steel media became black during the experiments conducted employing the acidic burnishing compound of Example 7. In the latter case, it was observed that the burnishing operation carried out employing a two percent of the acidic burnishing compound of Example 7 were blacker or darker than when the one percent solution was employed.

The exact reasons for these results are not known. However, discoloration is normally the result of the deposition of salts formed from a reaction betweem metal ions with acid or water. The visual results were unexpected because the burnishing compounds of Examples 1-6, especially Example 1, contained the product Component X, which is normally considered to be an alkaline inhibitor, and which is sold as such. Therefore, one would expect no inhibition using this material in an acid medium. The manufacturer has confirmed that no inhibition properties are to be expected with the employment of Component X in an acid medium. The results of these tests are, therefore, contrary to expectations and unpredictable.

III. Field Test Data

Samples of various parts and metals have been run in a customer service laboratory using a vibratory finishing machine (Spiratron ST-10 model - TM, Roto-Finish Company, Inc.) and by the technical department of the assignee employing the same equipment. Results employing case-hardened burnishing balls and the burnishing compounds of Examples 1-6 against the burnishing compound of Example 7 have shown that the products burnished employing the burnishing compound of Examples 1-6, particularly Example 1, have a greater lustre or are brighter. The reason for this is not known. It may be the result of the absence of a free amine in the burnishing compound of Examples 1-6.

During the progress of these test runs, the problem of rusting was observed. The problem of rusting of the case-hardened steel burnishing balls in a shut-down machine was greatly diminished when employing the burnishing compound of Examples 1-6 as compared with the burnishing compound of Example 7. The finishing machines were run with the burnishing compound of Examples 1 through 6, especially Example 1, and were then shut down overnight and even over a weekend without the presence of any rust showing up in the steel mass at the time of the next start-up.

It is to be understood that the term "finishing media" is used generally herein to designate materials used to impart all types of finishes, including those finishes acquired with abrading material as well as with polishing material, and that polishing, abrading, deburring, edge-breaking, buffing, burnishing, and the like, are as usual only species of finishing. The term "finishing media," as used herein, is also intended to include all such materials, but particularly steel burnishing balls and the like, which serve as loose, particulate, and solid finishing materials of the type presently employed in the trade and others of a similar nature whether natural or synthetic, including stone, porcelain, abrasive-filled clays, plastics, ceramics, wood, leather, or the like, and in any suitable shape or form as may be employed for the surface refinement and/or deburring of parts or workpieces, which are usually of metal or plastic, but in this case particularly parts or workpieces of ferrous or non-ferrous metals.

It is to be understood that the invention is not to be limited to the exact details of operation or exact compounds, compositions, methods, or procedures shown and described, as obvious modifications and equivalents will be apparent to one skilled in the art.

I claim:

1. In a metal finishing composition for burnishing of metallic components while subjecting said metallic components to the action of a solid finishing media, said composition comprising an aqueous acidic burnishing media and a rust and discoloration inhibitor the improvement comprising, as said inhibitor, an effective amount up to about 6% of a mixture of the compounds 6-[methyl(phenylsulfonyl) amino] hexanoic acid and 2,2',2"-nitrilotris(ethanol).

2. The composition of claim 1, wherein the compounds are present in the burnishing media in the proportion of approximately 1:1.

3. The composition of claim 1, comprising water in an amount between about 45 and 90 percent by weight, an organic acid in an amount between about 1 and 20 percent by weight, an amphoteric surfactant in an amount of about 1 to about 20 percent by weight, and said inhibitor.

4. The composition of claim 3, wherein the said compounds are present in the proportion of approximately 1 to 1.

5. The composition of claim 3, further containing a salt of an organic acid in an amount up to about 15 percent by weight.

6. The composition of claim 3, containing at least one of a detergent in an amount up to about 7 percent by weight, a wetting agent in an amount up to about 5 percent by weight, and a chelating agent in an amount up to about 10 percent by weight.

7. The composition of claim 3, wherein said inhibitor is present in an amount of about 1 to 2 percent by weight.

8. The composition of claim 5, comprising water between about 45 and 90 percent by weight, citric or gluconic acid between about 3 and 15 percent by weight, alkali metal salt of citric or gluconic acid between about 3 and about 15 percent by weight, amphoteric surfactant between about 3 and 10 percent by weight, and said inhibitor between about 1 and 6 percent by weight.

9. The composition of claim 8, containing water between about 46 and 87 percent by weight, citric acid or gluconic acid between about 3 and 15 percent by weight, sodium salt of citric or gluconic acid between about 3 and 15 percent by weight, and an amphoteric surfactant comprising a potassium salt of N-stearyl-amino acid in an amount between about 3 and 10 percent by weight.

10. The composition of claim 9, containing citric acid and citric acid sodium salt in an amount of about 9 percent, and water in an amount of about 87 percent.

11. The composition of claim 9, containing gluconic acid in an amount of about 12 percent, sodium gluconate in an amount of about 3 percent, and water in an amount of about 81 percent.

12. The composition of claim 8, containing water in an amount of about 70 percent, citric acid in an amount of about 12 percent, sodium citrate in an amount of about 12 percent, amphoteric surfactant in an amount of about five percent, and said inhibitor in an amount of about 1 to 2 percent by weight.

13. The method of inhibiting rust and discoloration of steel in the presence of an aqueous, acidic burnishing compound which comprises the step of adding to said acidic burnishing compound an effective amount up to about six percent by weight of a mixture of the compounds 6-[methyl(phenylsulfonyl)amino] hexanoic acid and 2,2',2"-nitrilotris(ethanol).

14. The method of claim 13, wherein the compounds are present in an approximately 1 to 1 mixture.

15. In a method for imparting a surface finish to metallic components while subjecting said metallic components to the action of a solid finishing media in the presence of an aqueous, acidic burnishing media, the step of employing, in said media, during the process, a mixture of the compounds 6-[methyl(phenylsulfonyl)amino] hexanoic acid and 2,2',2"-nitrilotris(ethanol), as rust and discoloration inhibitor.

16. The method of claim 15, wherein the compounds are employed in the proportion of approximately 1:1.

* * * * *

UNITED STATES PATENT AND TRADEMARK OFFICE
CERTIFICATE OF CORRECTION

PATENT NO. : 4,367,092

DATED : January 4, 1983

INVENTOR(S) : Bruno E. Unzens

It is certified that error appears in the above-identified patent and that said Letters Patent is hereby corrected as shown below:

Col 7, line 37: second column "Example 7 @ 1%"

should read --Example 7 @ 2%--

Signed and Sealed this

Twenty-second Day of March 1983

[SEAL]

Attest:

GERALD J. MOSSINGHOFF

Attesting Officer     Commissioner of Patents and Trademarks